Figure 1:
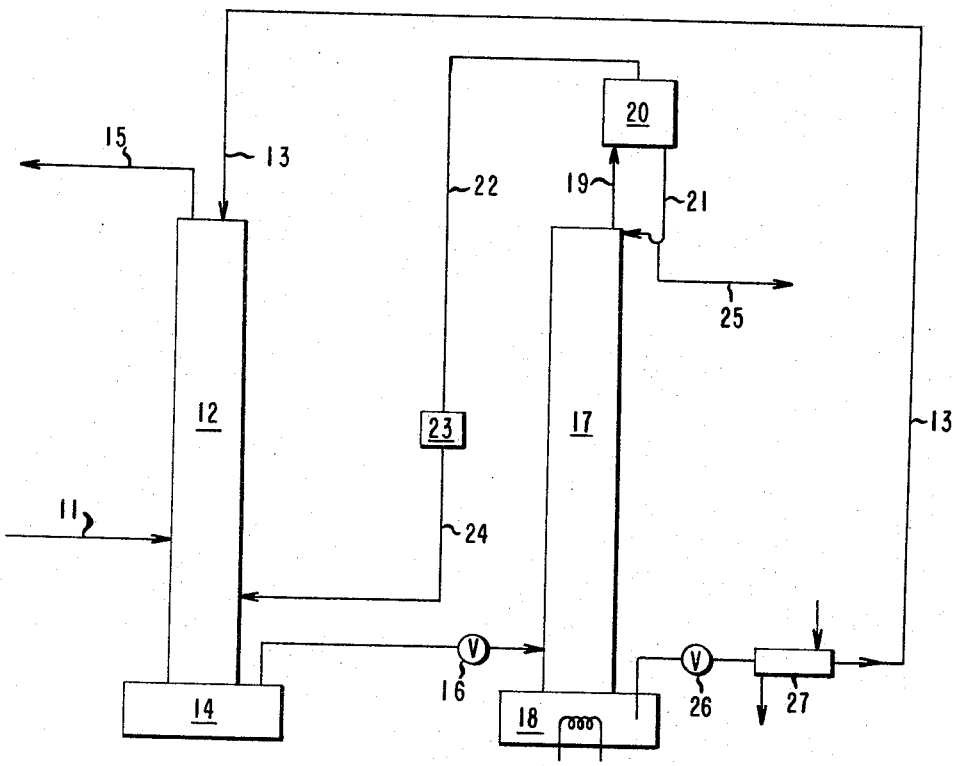

Oct. 17, 1967  D. G. HUTTON  3,347,021
SEPARATION OF HYDROGEN CHLORIDE FROM HIGHER BOILING HALOALKANES
Filed June 13, 1966

INVENTOR
DAVID G. HUTTON

BY  Robert E. Patridge

ATTORNEY

United States Patent Office 3,347,021
Patented Oct. 17, 1967

3,347,021
SEPARATION OF HYDROGEN CHLORIDE FROM HIGHER BOILING HALOALKANES
David Glenn Hutton, Newark, Del., assignor to E. I. du Pont de Nemours and Company, Wilmington, Del., a corporation of Delaware
Filed June 13, 1966, Ser. No. 557,071
6 Claims. (Cl. 55—71)

The present invention relates to the separation of hydrogen chloride from admixture with higher boiling haloalkanes and more particularly to the separation of such mixtures by contacting with a predominantly paraffinic hydrocarbon oil.

Fluoroalkanes and chlorofluoroalkanes are commonly prepared on a commercial scale by substitution fluorination of a variety of chloroalkanes with hydrogen fluoride using antimony halide as catalyst. Suitable chloroalkane starting materials include carbon tetrachloride, chloroform, methylene chloride, ethylene dichloride, trichloroethane, tetrachloroethane, pentachloroethane, and hexachloroethane. Hexachloroethane, a solid, is generally prepared in situ by adding chlorine to tetrachloroethylene. In all of these reactions the product is a mixture containing one or more fluoroalkane or chlorofluoroalkane and hydrogen chloride. Most uses for these haloalkane products require that they be recovered essentially free of other materials.

Separation of the various components of these product mixtures presents no particular problem except in the case of hydrogen chloride. Hydrogen chloride is generally removed by one of two techniques in commercial operations depending on the form in which it is desired.

Anhydrous hydrogen chloride is recovered by distillation of the product mixture containing hydrogen chloride and haloalkane. In order to provide good separation between the hydrogen chloride, which boils at −85° C. at 760 mm. Hg, and the higher boiling haloalkane, it is necessary that the hydrogen chloride be condensed for reflux which requires a combination of high pressure and low temperature in the reflux condenser. For example, when water cooling at a temperature of about 20° C. is used, a pressure of about 500 p.s.i.a. (35 kg./sq. in.) is required. When lower temperatures such as those provided by refrigeration are used, correspondingly less pressure is required, but refrigeration is expensive and considerably adds to the cost of the separation technique. In either case the separation is costly.

The other commercial method of removing hydrogen chloride is to separate the hydrogen chloride as an aqueous solution, which gives a product less desirable than the anhydrous form. Aqueous hydrogen chloride can be recovered by scrubbing the product mixture containing hydrogen chloride and haloalkane with water, thereby extracting the hydrogen chloride in the aqueous phase. However, the water scrubber required is a large piece of apparatus which considerably increases the cost of the process and aqueous hydrogen chloride solutions present serious corrosion problems. Moreover, the resulting aqueous solution still has to be distilled to concentrate the hydrogen chloride.

It is an object of this invention to provide a process for separating anhydrous hydrogen chloride from admixture with haloalkane which process does not require refluxing of hydrogen chloride. Another object is to provide a process which gives anhydrous hydrogen chloride without requiring excessively high pressures or low temperatures. A further object is to provide a process wherein both hydrogen chloride and the haloalkane are recovered essentially free of each other. Still another object is to provide a process which does not require the separation of gross amounts of hydrogen chloride by water scrubbing. These and other objects will become apparent from the following description of this invention.

It has been discovered that anhydrous hydrogen chloride can be separated from admixture with haloalkane having 1 to 2 carbon atoms and selected from the group consisting of fluoroalkanes and chlorofluoroalkanes without requiring refluxing of the hydrogen chloride by the process which comprises (a) contacting a mixture containing hydrogen chloride and haloalkane, in which all of the haloalkane boils in the range of about −45° to 140° C. at 760 mm. Hg, with 0.1 to 150 parts, per part of said mixture, of a predominantly paraffinic hydrocarbon oil having a boiling point of at least about 200° C. and containing no more than about 10% aromatics, the difference between the boiling point of the haloalkane and the hydrocarbon oil being at least about 100° C., whereby the haloalkane is dissolved in the hydrocarbon oil,
(b) recovering anhydrous hydrogen chloride essentially free of haloalkane as the undissolved effluent,
(c) separating the haloalkane from the hydrocarbon oil by rectification, and
(d) recovering enriched haloalkane.

In accordance with this invention, it has been discovered that essentially all of the haloalkane dissolves in the hydrocarbon oil, while hydrogen chloride, essentially free of haloalkane, remains in the gas phase. The haloalkane dissolved in the hydrocarbon oil is readily recovered by heating the solution thereby vaporizing the more volatile haloalkane. Thus, hydrogen chloride and haloalkane are recovered essentially free of each other without requiring refluxing of the hydrogen chloride or scrubbing with water to remove gross amounts of hydrogen chloride.

Figure 2:
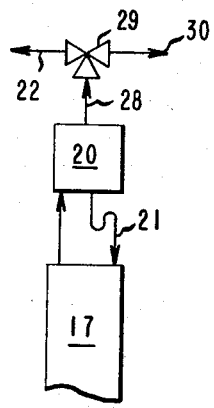

FIGURE 1 illustrates a schematic flow diagram of the process in accordance with this invention. FIGURE 2 illustrates an optional variation in the process of FIGURE 1. The present process will be more easily understood by reference to the accompanying drawing.

In FIGURE 1, a mixture of hydrogen chloride and haloalkane, which may be liquid, gaseous or a combination thereof depending on its exact composition, and temperature, enters countercurrent contacting tower 12 via line 11 near its bottom while a predominantly paraffinic hydrocarbon oil enters near the top via line 13. Gases flow upward through tower 12 while the hydrocarbon oil flows downward into reservoir 14. Gaseous hydrogen chloride, essentially free of other substances, leaves tower 12 via line 15 for recovery. The hydrocarbon oil containing dissolved haloalkane in reservoir 14 passes via pressure relief valve 16 into fractionation column 17 which operates at a lower pressure than tower 12. In column 17 the oil containing volatile haloalkane comes into contact with vapors from reboiler 18 and liquid reflux from reflux return line 21. The volatile haloalkane then passes up column 17 through vapor line 19 into reflux condenser 20 where much of it is condensed. A portion of the condensate returns to the column via return line 21. Any uncondensed material, mainly the small amount of hydrogen chloride carried over from tower 12, may be returned to tower 12 via line 22, compressor 23 and line 24. A portion of the condensate from line 21 is removed from the system via line 25.

The hydrocarbon oil entering column 17 eventually flows into reboiler 18 where it is heated to completely volatilize the haloalkane. The oil level in reboiler 18 is maintained substantially constant by pumping the oil via check valve 26 and cooler 27 back to contacting tower 12 via line 13.

The composition of the hydrogen chloride gas taken from line 15 and the haloalkane product taken from line 25 depends primarily on the efficiency obtained in contacting tower 12. Since the haloalkane is of greater value than hydrogen chloride, it is desirable that little or no chlorofluoroalkane, fluoroalkane or chloroalkane be present in the hydrogen chloride. This is accomplished by proper adjustment of the height of tower 12 and the relative flow rates of the mixture entering via line 11 and the hydrocarbon oil entering via line 13. For any particular tower, it is a matter of simple adjustment of the two feed rates to obtain the desired results. In general, the highest practical oil flow rate gives the best results. The small amount of oil, corresponding to the vapor pressure of the oil, which remains in the hydrogen chloride recovered via line 15, is usually negligible.

Generally, it is preferable to operate tower 12 at about ambient temperature. Higher temperatures decrease its efficiency. Although lower temperatures might increase its efficiency, the increase obtained does not offset the expense of cooling.

It is necessary that column 17 provide a substantial amount of rectification to remove all of the hydrocarbon oil vapors before reaching condenser 20. The difference in the boiling points between the haloalkane and the oil determines the minimum amount of rectification required. On the other hand, a given amount of rectification will dictate the required difference in boiling points. The differential between the boiling point of the haloalkane and the oil should be at least about 100° C., and preferably at least about 150° C. The specific operating conditions of column 17, reboiler 18 and condenser 20 are determined, of course, by the particular haloalkane present.

In accordance with this invention, condenser 20 can be operated at temperatures provided by water cooling. For haloalkanes having boiling points above the usual water cooling temperatures, the pressure in column 17 may be maintained at about atmospheric pressure. In the case of haloalkanes having boiling points below the water cooling temperature, some pressure will be required to obtain condensation. For example, in the case of haloalkanes having boiling points of −45° C., assuming a water cooling temperature of 20° C., the maximum pressure required will be about 150 p.s.i.a. (10 kg./sq. cm.), which is considerably below the pressure of about 500 p.s.i.a. (35 kg./sq. cm.) required to distill hydrogen chloride from the haloalkane as the initial separation step. The pressure required is determined by the vapor pressure of the haloalkane at the condenser temperature. Compressor 23 and valve 26 are adjusted to maintain this pressure. Contacting tower 12 should operate at a higher pressure than column 17 or otherwise a pump must be substituted for valve 16 whereby the oil composition from reservoir 14 is pumped into column 17.

The amount of hydrogen chloride in the haloalkane removed via line 25 will depend on the amount of hydrogen chloride in column 17 and its solubility in the haloalkane under the conditions existing in condenser 20. Since the amount of residual hydrogen chloride is usually small, it can be removed, if desired, by water scrubbing without creating a large amount of by-product aqueous hydrogen chloride.

As an alternative to the apparatus shown in FIGURE 1, the modification illustrated in FIGURE 2 may be used. In this modification, condenser 20 is operated with cooling water at atmospheric pressure. This system should be used only with haloalkanes having boiling points below the water cooling temperature in condenser 20 at atmospheric pressure; otherwise condensed haloalkane would return to column 17 via line 21 and thus could not be removed from the system. Uncondensed vapors, such as hydrogen chloride and low boiling haloalkanes from condenser 20, pass via line 28 to valving means 29 where a fixed proportion of the uncondensed vapors is returned to tower 12 via line 22 and the remaining portion is removed from the system via line 30. The uncondensed vapors recovered via line 30, containing haloalkane and a small amount of hydrogen chloride, can be scrubbed with water to remove the hydrogen chloride. The amount of aqueous hydrogen chloride recovered in this manner is small compared with the amount of anhydrous hydrogen chloride recovered via line 15.

This alternate system is of advantage since it does not require pressure for low boiling haloalkanes. It is of use where it is desirable to remove all of the haloalkane from the hydrogen chloride leaving the system via line 15 but where relatively larger amounts of hydrogen chloride can be tolerated in the haloalkane leaving the system via line 30 for subsequent removal by water scrubbing. This modification is usually less efficient in hydrogen chloride recovery than the system of FIGURE 1. From an economics standpoint, the greater cost of pressure operation in accordance with FIGURE 1 is only partially offset by the added cost of the water scrubbing facilities generally required with atmospheric pressure operation in accordance with FIGURE 2.

In normal operation the feed composition is a gaseous effluent mixture coming directly from a fluorination reaction. Since this effluent mixture is generally at elevated temperature it may contain normally liquid haloalkane. As indicated earlier, all of the haloalkane must have a boiling point of at least about −45° C. to provide a good separation from hydrogen chloride in this process. The maximum boiling point for the haloalkane of about 140° C. includes substantially all haloalkanes normally encountered in this process, and provides a difference in boiling point of at least about 100° C. between such high boiling haloalkanes and typical paraffinic hydrocarbon oils boiling at about 240° C.

Since the hydrocarbon oil is usually a mixture of hydrocarbons, it is intended that there be a 100° C. difference between the boiling point of the haloalkane and the lowest boiling component of the hydrocarbon oil. For example, when $C_2HClF$ (boiling point 116° C.) or $C_2FCl_5$ (boiling point 137° C.) is being separated from hydrogen chloride, a hydrocarbon oil in which all components have a boiling point of at least about 240° C. should be used to provide a clean separation between the chlorofluorocarbon and the hydrocarbon oil. When the haloalkane is a mixture, there should be a 100° C. difference between the boiling point of the highest boiling haloalkane and the lowest boiling component of the oil.

The haloalkanes which are readily separated from hydrogen chloride by the process of this invention are fluoroalkanes and chlorofluoroalkanes having 1 to 2 carbon atoms which boil in the range of about −45° C. to 140° C. Suitable haloalkanes include those of the empirical formulae: $CCl_3F$, $CCl_2F_2$, $CHCl_2F$, $CHClF_2$, $CH_2ClF$, $C_2H_4ClF$, $C_2H_4F_2$, $C_2H_3ClF_2$, $C_2H_3F_3$, $C_2H_3Cl_2F$, $C_2H_2Cl_3F$, $C_2H_2Cl_2F_2$, $C_2H_2ClF_3$, $C_2H_2F_4$, $C_2HCl_4F$, $C_2HCl_3F_2$, $C_2HCl_2F_3$, $C_2HClF_4$, $C_2Cl_5F$, $C_2Cl_4F_2$, $C_2Cl_3F_3$, $C_2F_4Cl_2$, $C_2F_5Cl$ and mixtures thereof. Of the above group, $CHClF_2$, $CCl_3F$, $CCl_2F_2$, $C_2Cl_3F_3$ and $C_2Cl_2F_4$ are major industrial products and hence are preferred.

The hydrocarbon oil should be used in an amount of about 0.1 to 150 parts by weight per part of hydrogen chloride-haloalkane mixture, and preferably about 0.5 to 50 parts of oil per part of mixture. The hydrocarbon oil, in addition to having a boiling point of at least about 200° C., must be predominantly paraffinic hydrocarbons.

By "paraffinic" hydrocarbons is meant saturated, acyclic hydrocarbons which may be either straight or branched chain. By "predominantly" paraffinic hydrocarbons is meant at least about 75% by weight paraffinic hydrocarbons. While some naphthenic hydrocarbons can be tolerated, the oil should contain no more than about 10% aromatic hydrocarbons since hydrogen chloride is considerably more soluble in aromatic than paraffinic hydrocarbons.

The following examples, illustrating the novel separation process disclosed herein, are given without any intention that the invention be limited thereto. All percentages are by weight unless otherwise specified.

EXAMPLES 1 TO 3

These examples were carried out in apparatus similar to that shown in FIGURE 2. Contacting tower 12 consisted of two 2.0 cm. x 50 cm. towers, one above the other in series, packed with ⅛ in. glass helices. Line 11 entered between the two towers. Fractionating column 17 consisted of two 2.0 cm. x 30 cm. Vigreux columns, one above the other in series. Line 16 from column 12 entered between the two columns. Condenser 20 was a water cooled glass spiral type condenser, lines 19 and 21 being the glass connection between the condenser and the top Vigreux column. Valving means 29 was a solenoid operated three-way metal valve. Line 24 entered the bottom of the lower tower. Reboiler 18 was a heated one liter flask attached to the lower Vigreux column and cooler 27 was a water cooled condenser.

Mixtures of HCl and $CF_2Cl_2$ were fed into tower 12 through line 11 at atmospheric pressure, while hydrocarbon oil was pumped down through tower 12 at 25° C. and a feed rate of 22 ml. per minute. The hydrocarbon oil, known as Isopar M, was over 99% branched chain paraffins and had a boiling range of 204° to 249° C. Reboiler 18 was operated at 220° C. and valve 29 was adjusted to provide a flow ratio of 1:1 between lines 22 and 30. The products leaving lines 15 and 30 were analyzed after the system had reached steady state. The variables and results are shown below.

|  | Example | | |
|---|---|---|---|
|  | 1 | 2 | 3 |
| Gas feed rate, ml./min | 128 | 158 | 180 |
| Oil/gas feed weight ratio | 45.7 | 37.1 | 37.2 |
| Mole percent $CF_2Cl_2$, line 11 | 45 | 45 | 34 |
| Mole percent $CF_2Cl_2$: | | | |
| Line 15 | 0.6 | 1.45 | 2.0 |
| Line 28 | 78 | 88 | 81.5 |

Decreasing the gas feed rate below 128 ml./min. results in even less $CF_2Cl_2$ in the HCl product from line 15.

EXAMPLES 4 TO 6

These examples were carried out in apparatus similar to that described in Examples 1 to 3. Tower 12 consisted of a 2.0 cm. x 88 cm. column packed with 0.05 x 0.1 x 0.1 inch Podbielniak "Heli-Pak" made of nichrome. The feed gas entered via line 11 at the midpoint of this column. Column 17 consisted of an upper 2.0 cm. x 20 cm. Vigreux column in series with a lower 2.5 cm. x 5 plate Oldershaw sieve plate column. Line 16 entered between the two columns. The rest of the apparatus was the same as in Examples 1 to 3.

A mixture containing 54 mole percent $CH_3CClF_2$ and the remainder HCl was fed into tower 12 through line 11 at a rate equivalent to 100 ml./min. measured at 1 atm. and 25° C., while hydrocarbon oil at 25° C. was pumped down through the tower at the feed rate indicated below. The oil was the same as in Examples 1 to 3. Reboiler 18 was operated at 222° C. and valve 29 was adjusted to provide a flow ratio of 1:1 between lines 22 and 30. The products leaving lines 15 and 30 were analyzed after the system reached steady state. Analyses were by vapor phase chromatography, comparing the chlorodifluoroethane peak to a sample of pure chlorodifluoroethane. The variables and results are shown below.

|  | Example | | |
|---|---|---|---|
|  | 4 | 5 | 6 |
| Oil feed rate, ml./min | 42 | 30 | 24 |
| Oil/gas feed weight ratio | 110 | 81 | 65 |
| Absorber overhead, line 15: | | | |
| Percent $C_2H_3ClF_2$ | 0.04 | 0.3 | 0.5 |
| Percent HCl | 99.96 | 99.7 | 99.5 |
| Still overhead, line 30: | | | |
| Percent $C_2H_3ClF_2$ | 54 | 65 | >98 |
| Percent HCl | 46 | 35 | <2 |

EXAMPLES 7 TO 9

A mixture containing 45 mole percent $CF_2Cl_2$ and 55 mole percent HCl was passed into the bottom of a 2 cm. x 50 cm. glass countercurrent contacting tower packed with ⅛ in. helices and operating at 25° C. and atmospheric pressure. A hydrocarbon oil containing 80% paraffins, 10% aromatics, and 10% other, and having a boiling range of 265° to 327° C., and known as Esso Mentor No. 28 Oil, was pumped into the top of the tower at the rate of 22 ml. per min. The gas feed rates and results are shown below.

|  | Example | | |
|---|---|---|---|
|  | 7 | 8 | 9 |
| Gas feed rate, ml./min | 158 | 192 | 230 |
| Oil/gas feed weight ratio | 37.1 | 30.5 | 25.5 |
| Mole percent $CF_2Cl_2$, line 15 | 0.25 | 0.7 | 1.5 |

These examples demonstrate that relatively large amounts of haloalkane can be effectively removed from HCl at quite substantial feed rates by oil absorption using simple apparatus and mild conditions.

Although the invention has been described and exemplified by way of specific embodiments, it is to be understood that it is not limited thereto. As will be apparent to those skilled in the art, numerous modifications and variations of these embodiments may be made without departing from the spirit of the invention or the scope of the following claims.

The embodiments of the invention in which an exclusive property or privilege is claimed are defined as follows:

1. A process for separating hydrogen chloride from admixture with a haloalkane having 1 to 2 carbon atoms and selected from the group consisting of fluoroalkanes and chlorofluoroalkanes, said mixture resulting from the fluorination of a chloroalkane, which comprises
    (a) contacting said mixture containing hydrogen chloride and haloalkane, in which all of the haloalkane boils in the range of −45° to 140° C. at 760 mm. Hg, as the first process step after fluorination, with 0.1 to 150 parts by weight, per part of said mixture, of a predominantly paraffinic hydrocarbon oil having a boiling point of at least 200° C. and containing no more than 10% aromatics, the difference between the boiling point of the haloalkane and the hydrocarbon oil being at least 100° C., whereby the haloalkane is dissolved in the hydrocarbon oil,
    (b) recovering anhydrous hydrogen chloride essentially free of haloalkane as the undissolved effluent,
    (c) separating the haloalkane from the hydrocarbon oil by rectification, and
    (d) recovering enriched haloalkane.

2. The process of claim 1 in which said mixture is a gaseous effluent coming directly from a fluorination reaction and 0.5 to 50 parts by weight of oil are used per part of said mixture.

3. The process of claim 2 in which substantially pure haloalkane is recovered by condensation of haloalkane vapors at a temperature above 0° C.

4. The process of claim 3 in which the haloalkane is halomethane.

5. The process of claim 2 in which enriched haloalkane containing a small amount of hydrogen chloride is separated from the oil, hydrocarbon chloride is separated from the haloalkane by water washing, and substantially pure haloalkane is recovered.

6. The process of claim 5 in which the haloalkane is halomethane.

References Cited

UNITED STATES PATENTS

| 2,558,011 | 6/1951 | Sprauer et al. | 23—154 |
| 3,236,030 | 2/1966 | Von Tress | 55—71 |

REUBEN FRIEDMAN, *Primary Examiner.*

C. N. HART, *Assistant Examiner.*

UNITED STATES PATENT OFFICE
CERTIFICATE OF CORRECTION

Patent No. 3,347,021                            October 17, 1967

David Glenn Hutton

It is hereby certified that error appears in the above numbered patent requiring correction and that the said Letters Patent should read as corrected below.

Column 4, line 48, for "$C_2HClF$" read -- $C_2HCl_4F$ --;

column 7, line 8, for "hydrocarbon" read -- hydrogen --.

Signed and sealed this 12th day of November 1968.

(SEAL)
Attest:

Edward M. Fletcher, Jr.                          EDWARD J. BRENNER
Attesting Officer                                Commissioner of Patents